(12) United States Patent
Giannasca

(10) Patent No.: US 8,458,869 B2
(45) Date of Patent: Jun. 11, 2013

(54) ADJUSTABLE CONNECTOR

(76) Inventor: John Giannasca, Point Lookout, NY (US)

( * ) Notice: Subject to any disclaimer, the term of this patent is extended or adjusted under 35 U.S.C. 154(b) by 433 days.

(21) Appl. No.: 12/695,967

(22) Filed: Jan. 28, 2010

(65) Prior Publication Data

US 2010/0129148 A1 May 27, 2010

Related U.S. Application Data

(63) Continuation-in-part of application No. 12/053,284, filed on Mar. 21, 2008, now abandoned, which is a continuation-in-part of application No. 10/907,332, filed on Mar. 29, 2005, now Pat. No. 7,367,279.

(60) Provisional application No. 61/206,334, filed on Jan. 29, 2009.

(51) Int. Cl.
*A44B 17/00* (2006.01)

(52) U.S. Cl.
USPC .............................................. 24/686; 29/453

(58) Field of Classification Search
USPC .... 24/682.1, 683, 686; 29/451, 453; 403/380, 403/376
See application file for complete search history.

(56) References Cited

U.S. PATENT DOCUMENTS

| | | | |
|---|---|---|---|
| RE16,323 E | 4/1926 | Weber | |
| 1,970,630 A | 8/1934 | Searing | |
| 2,059,059 A | 10/1936 | Thompson | |
| 2,100,635 A * | 11/1937 | De Vries Abraham | 24/621 |
| 2,277,171 A | 3/1942 | Traylor | |
| 2,604,146 A | 7/1952 | Martin | |
| 2,901,208 A | 8/1959 | Jones | |
| 2,978,243 A | 4/1961 | Gabrielson | |
| 3,203,670 A | 8/1965 | Farris | |
| 3,351,314 A | 11/1967 | Hirsch et al. | |
| 3,428,976 A | 2/1969 | Robinson | |
| 3,628,204 A | 12/1971 | Hoffman, Jr. | |
| 3,701,226 A | 10/1972 | Fulcher | |
| 3,796,282 A | 3/1974 | Denier et al. | |
| 3,916,756 A * | 11/1975 | Yoda | 24/682.1 |
| 3,961,681 A | 6/1976 | Fisher | |
| 4,151,804 A | 5/1979 | Wache et al. | |
| 4,232,901 A | 11/1980 | Harrington et al. | |
| 4,497,093 A * | 2/1985 | Haberkorn | 24/595.1 |
| 4,930,435 A | 6/1990 | Newman | |
| 5,066,001 A | 11/1991 | Wilkinson | |
| 5,435,260 A | 7/1995 | Granie et al. | |

(Continued)

FOREIGN PATENT DOCUMENTS

JP 2002289298 A * 10/2002
WO WO 20061105280 10/2006

OTHER PUBLICATIONS

International Search Report for WO2006105280 Jun. 27, 2006.

(Continued)

*Primary Examiner* — James Brittain
(74) *Attorney, Agent, or Firm* — Collard & Roe, P.C.

(57) ABSTRACT

An adjustable connector is formed by, an comprises an outer housing, and an inner housing, with the inner housing being positioned inside of the outer housing. This inner housing forms a first connector wherein the inner housing is movable inside of the outer housing. There is also a complementary connector configured to connect to the first connector.

22 Claims, 13 Drawing Sheets

U.S. PATENT DOCUMENTS

| | | | |
|---|---|---|---|
| 5,769,651 A * | 6/1998 | Omura et al. | 439/248 |
| 5,771,816 A | 6/1998 | Zaguroli, Jr. | |
| 5,772,559 A | 6/1998 | Sithole | |
| 5,947,509 A * | 9/1999 | Ricks et al. | 280/728.2 |
| 6,244,205 B1 | 6/2001 | Saccocio | |
| 6,506,069 B2 * | 1/2003 | Babala et al. | 439/248 |
| 6,698,371 B1 | 3/2004 | Stoltzfus | |
| 6,763,774 B1 | 7/2004 | Ranieri et al. | |
| 7,367,279 B2 | 5/2008 | Giannasca | |
| 7,383,786 B2 | 6/2008 | Giannasca | |
| 7,963,011 B2 * | 6/2011 | Lottini et al. | 24/683 |
| 2003/0097738 A1 * | 5/2003 | Hilgers et al. | 24/682.1 |
| 2005/0101444 A1 | 5/2005 | Dadbeh | |
| 2006/0219149 A1 | 10/2006 | Giannasca | |
| 2006/0219150 A1 | 10/2006 | Giannasca | |
| 2008/0190350 A1 | 8/2008 | Giannasca | |
| 2010/0129148 A1 | 5/2010 | Giannasca | |

OTHER PUBLICATIONS

Non final Office Action for U.S. Appl. No. 11/329,016 dated Apr. 11, 2007.
Final Office Action for U.S. Appl. No. 11/329,016 dated Oct. 30, 2007.
Notice of Allowance for U.S. Appl. No. 11/329,016 dated Feb. 12, 2008.
Non Final office Action for U.S. Appl. No. 12/053,284 Dated Dec. 28, 2009.
Notice of Abandonment U.S. Appl. No. 12/053,284 Dated Jul. 21, 2010.
Notice of Allowance for U.S. Appl. No. 10/907,332 dated Dec. 19, 2007.
Examiner interview summary for U.S. Appl. No. 10/907,332 dated Dec. 19, 2007.
Examiner interview summary for U.S. Appl. No. 10/907,332 dated Sep. 24, 2007.
Examiner interview summary for U.S. Appl. No. 10/907,332 dated May 21, 2007.
Non final rejection for U.S. Appl. No. 10/907,332 dated Jul. 27, 2007.
Non final rejection for U.S. Appl. No. 10/907,332 dated Jun. 2, 2007.
Final Rejection for U.S. Appl. No. 10/907,332 dated Jan. 18, 2007.
Ex Parte Quayle Action for U.S. Appl. No. 10/907,332 dated Oct. 19, 2007.

* cited by examiner

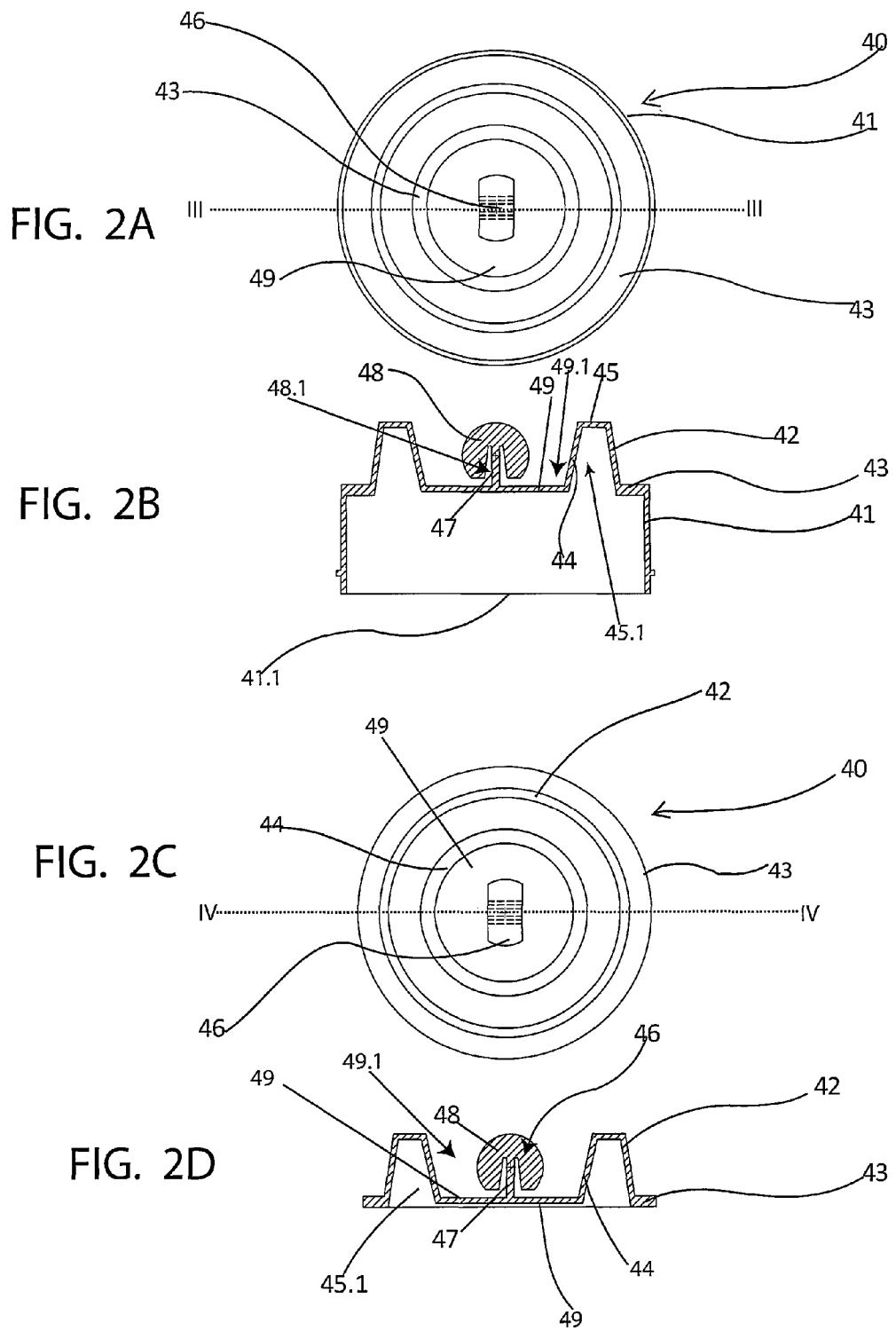

SECTION D-D

SECTION C-C

SECTION A-A

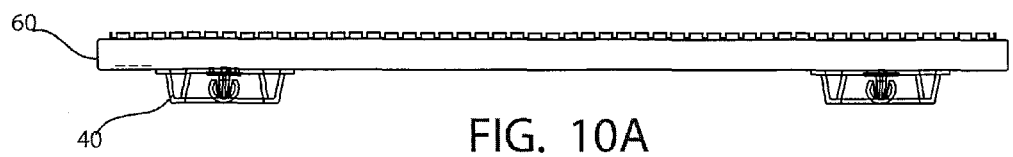
FIG. 10A
FIG. 10B
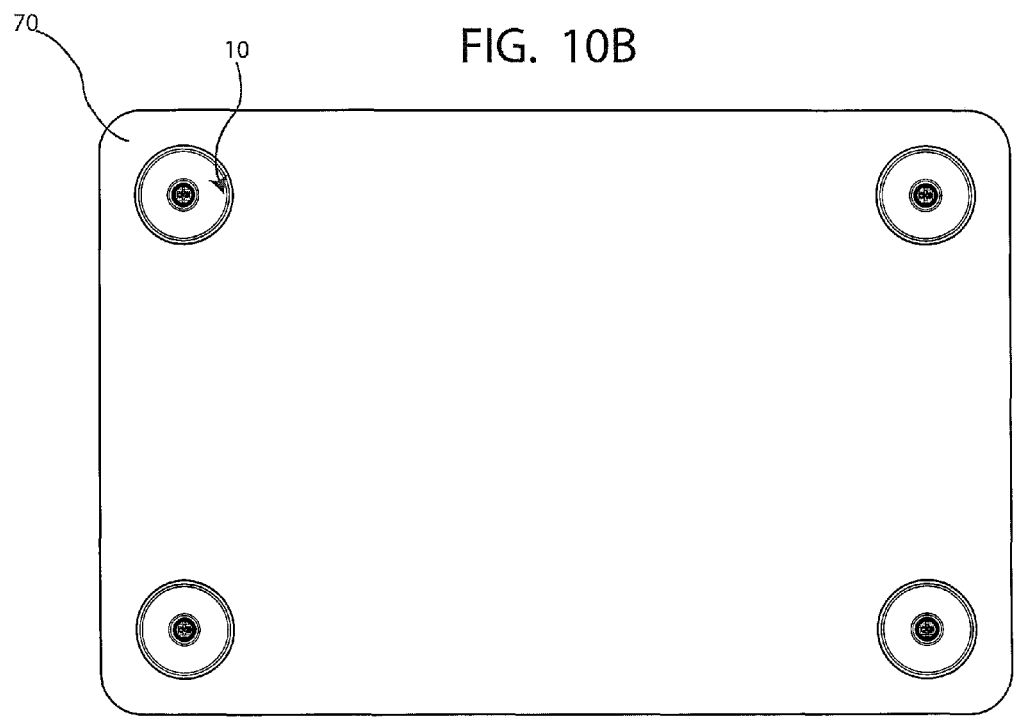
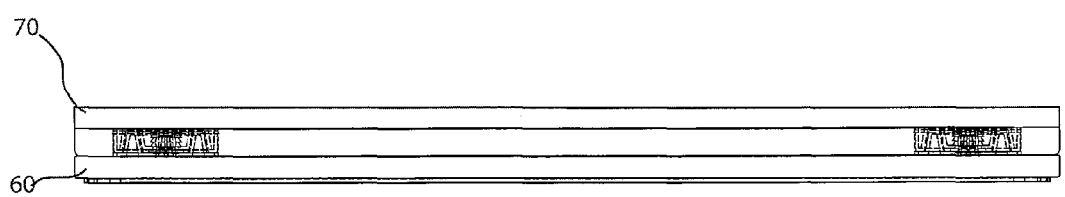
FIG. 10C

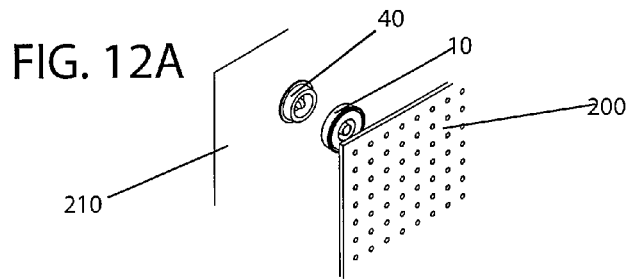
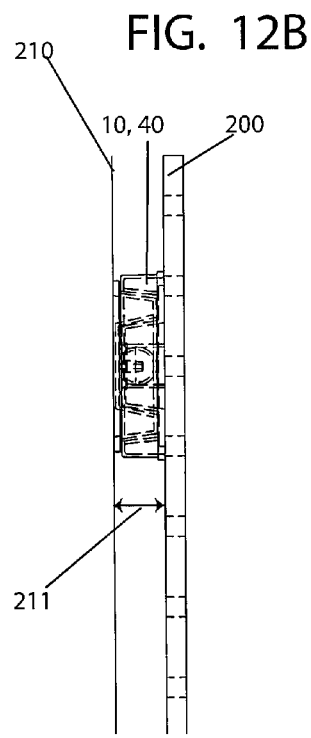
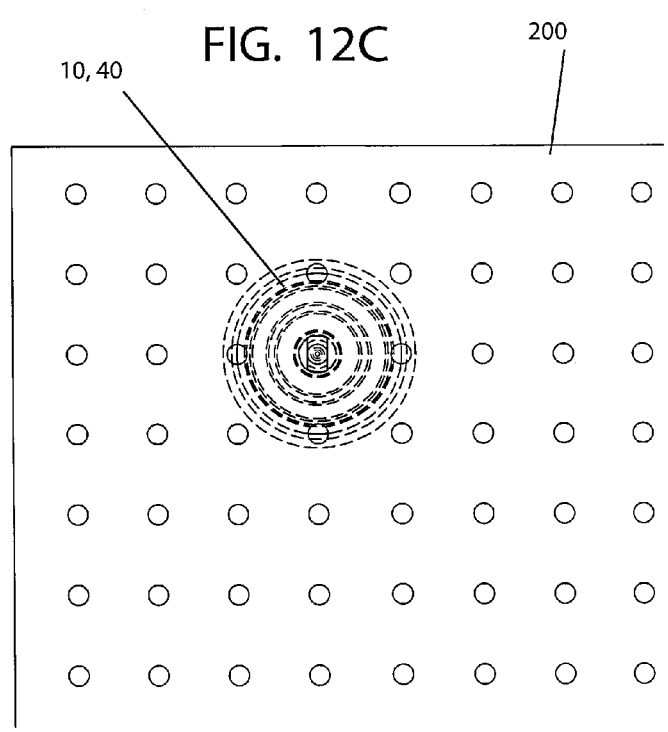

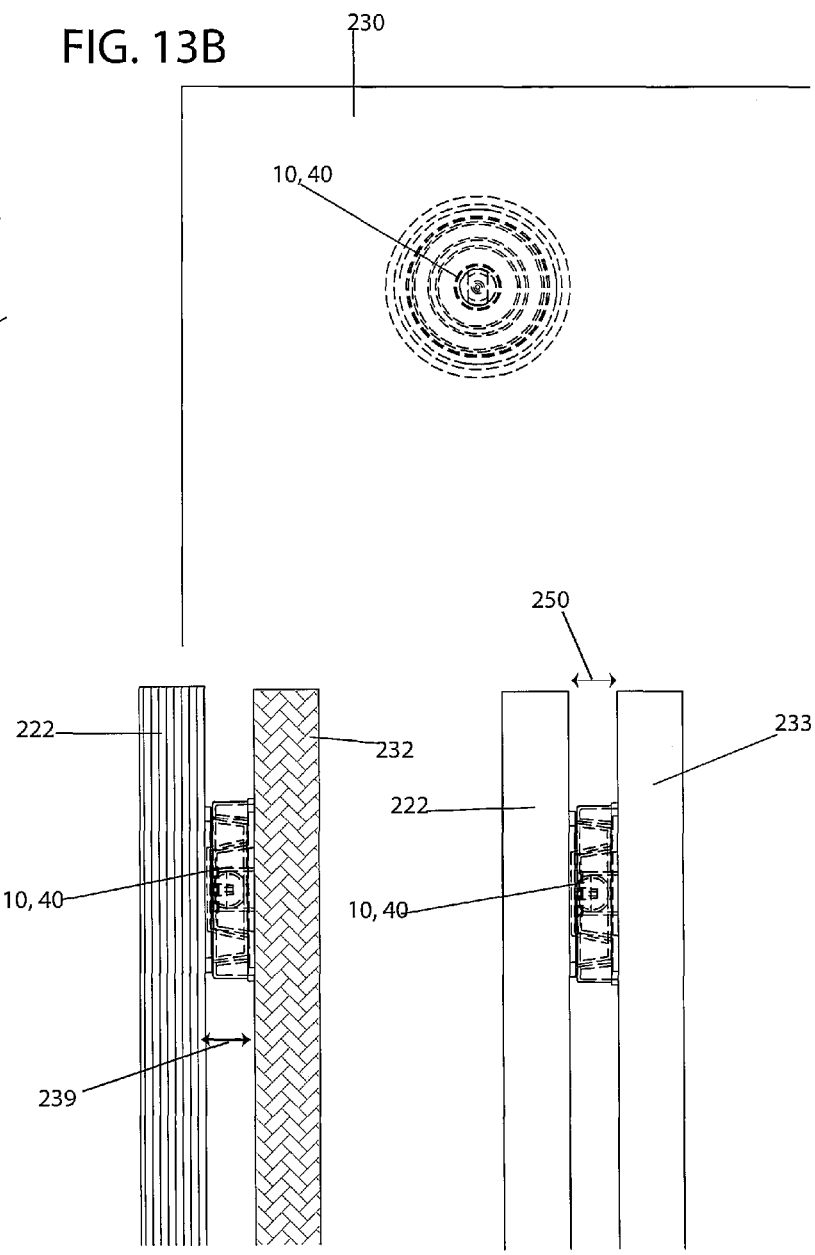

ADJUSTABLE CONNECTOR

CROSS REFERENCE TO RELATED APPLICATIONS

Applicant claims priority under 35 U.S.C. §119e from Provisional Application Ser. No. 61/206,334 filed on Jan. 29, 2009, the disclosure of which is hereby incorporated herein by reference, additionally applicant claims priority from U.S. patent application Ser. No. 12/053,284, filed on Mar. 21, 2008 which was a continuation in part application of U.S. patent application Ser. No. 10/907,332 filed on Mar. 29, 2005 which issued as U.S. Pat. No. 7,367,279 on May 6, 2008 the disclosures of these applications and patent are hereby incorporated herein by reference in their entirety.

BACKGROUND

One embodiment of the invention relates to a novel way for connecting two different items together with tolerance between the connecting items. Previously, when connecting two items together, the two items would have to line up exactly in order to connect together. In the past two different connectors such as a male and a female connector could be connected together. However, this connection would have to be exact, otherwise the male connector would not fit inside the female connector. Therefore, there is a need for a system for connecting components or two complementary connectors together.

SUMMARY

One embodiment of the invention relates to an adjustable connector which is formed by, and comprises an outer housing, and an inner housing, with the inner housing being positioned inside of the outer housing. This inner housing forms a first connector wherein the inner housing is movable inside of the outer housing. There is also a complementary connector configured to connect to the first connector.

BRIEF DESCRIPTION OF THE DRAWINGS

Other objects and features of the present invention will become apparent from the following detailed description considered in connection with the accompanying drawings. It should be understood, however, that the drawings are designed for the purpose of illustration only and not as a definition of the limits of the invention.

In the drawings, wherein similar reference characters denote similar elements throughout the several views:

FIG. 2A is a top view of a male connector;

FIG. 2B is a side cross sectional view of a male connector taken along the line III-III;

FIG. 2C is a top view of another embodiment of a male connector;

FIG. 2D is a cross-sectional view of the male connector taken along the line IV-IV;

FIG. 10A is a side cross-sectional view of a male connector coupled to a mat;

FIG. 10B is a bottom view of a mat having at least one of a male connector or a female connector;

FIG. 10C is a side cross-sectional view of a male connector inserted into a female connector;

FIG. 12A shows a top perspective view of a peg board implementation of the connector;

FIG. 12B shows a side view of a peg board implementation of the connector; and

FIG. 12C shows a front view of a peg board implementation of the connector.

FIG. 13A is a side perspective view of the connector on a board;

FIG. 13B is a back side view;

FIG. 13C is a side view of the connector connecting a particle board with a plate;

FIG. 13D is a side view of the connector connecting a particle board with plywood; and FIG. 13E is a side view of the connector connecting two backings together.

DETAILED DESCRIPTION OF PREFERRED EMBODIMENTS

Figure 1A:
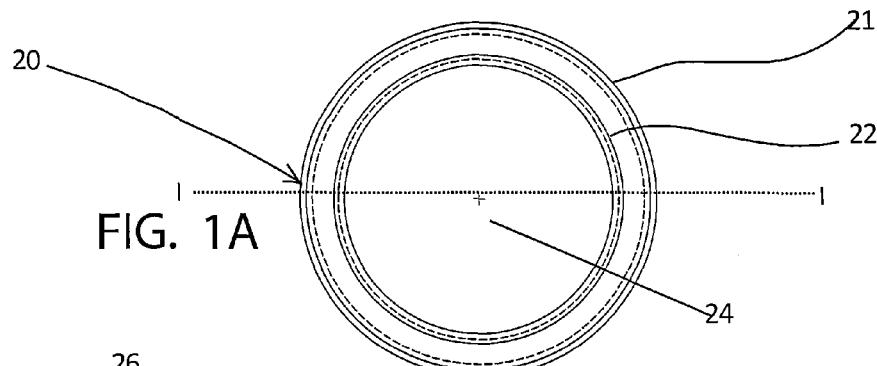
FIG. 1A shows a back view of an outer housing.

Turning to the drawings, FIG. 1A shows a back view of an outer housing 20 having an outer rim 21 and an inner rim 22. There is also a central opening or inner open region 24 disposed inside of inner rim 22. This housing can be of any shape, but in this case is shown with a circular shape, wherein outer rim is substantially circular, inner rim is substantially circular, and central open region 24 is substantially circular.

Figure 1B:
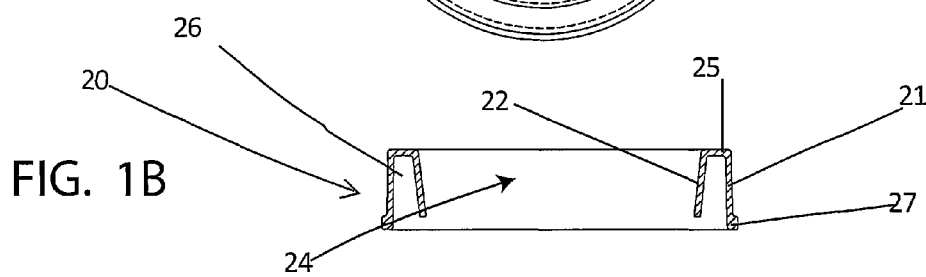
FIG. 1B shows a side cross-sectional view taken along the line I-I of the outer housing.

FIG. 1B shows a side cross-sectional view of outer housing 20 taken along the line I-I of outer housing 20. In this view, there is also shown outer rim 21, and outer lip 27 disposed on outer rim 21. In addition, inner rim 22 is shown as being connected to a ridge 25 formed from the elevation of outer rim 21 and the extension of inner rim 22. Ridge 25 has a flat surface, wherein the depth of inner rim 22 is shorter than the depth of outer rim 21, thereby forming a gap region 28. Between outer rim 21, and inner rim 22 is an open region 26. This open region is shown as trapezoidal in shape. Outer housing 20 has a back surface 24 as well.

Figure 1C:
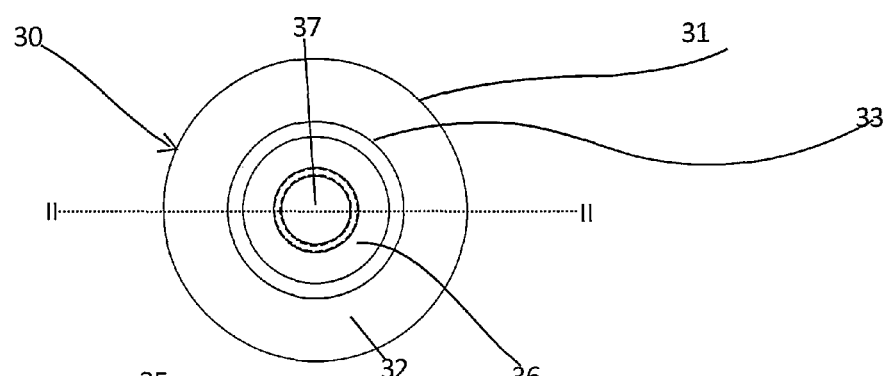
FIG. 1C shows a top view of the inner housing.
Figure 1D:
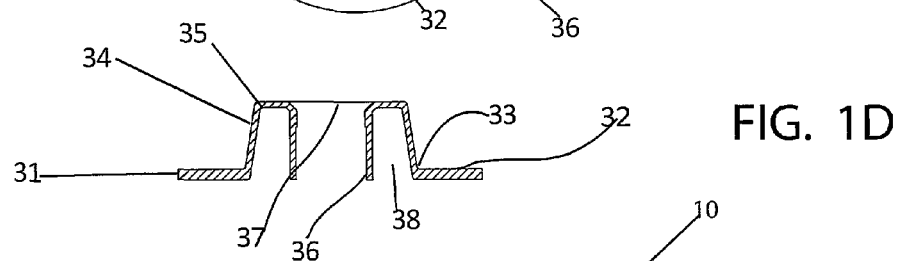
FIG. 1D shows a side cross-sectional view of the inner housing of FIG. 1C taken along the line II-II.

FIG. 1C shows a top view of the inner housing 30. Inner housing has an outer rim 31 a lip portion 32, a first angled region 33, an intermediate rim 34, a ridge 35, and an inner rim 36. There is a central hole or opening 37 formed inside of inner rim 36. In addition, there is a ridge 36.1 formed on inner rim 36. Ridge 36.1 (See FIG. 1E) is configured to form a snap enclosure for a male fastener. An outer open area 38 (See FIG. 1D) is also formed between inner rim 36 and intermediate rim 34.

Both the outer housing 20 and the inner housing 30 can be formed from any suitable material such as metal, rubber plastic, composite metal, or any other suitable material. In at least one embodiment, inner housing 30 is formed from a material that is capable of plastic deformation such as a plastic, rubber or metal such that inner rim can be pressed in, particularly ridge portion 36.1 when a male connector is inserted therein.

Figure 1E:
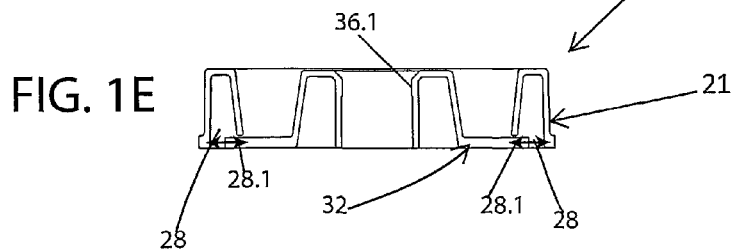
FIG. 1E shows a side cross-sectional view of the two housings positioned one inside the other.

FIG. 1E shows a side cross-sectional view of a combination of the outer housing 20 and the inner housing 30, with inner housing 30 being disposed inside of the outer housing 20. The slidable connector 10 comprises outer housing 20 and inner housing 30. In this configuration, inner housing 30 is slidable inside of gap region 28 formed between an outer rim 31 and an inner rim 21, and along slide path 28.1 formed between inner rim 22 and outer rim 21 of outer housing. In addition, lip 32 is trapped inside of gap region 28, which is formed from the shorter depth of inner rim 22. In this case, inner rim 22, forms a substantially perpendicular intersection with lip 32, such that inner housing 30 is slidable inside of outer housing 20 with the intersection of lip 32 with inner rim 22 being the region responsible for holding inner housing 30 within outer housing 20.

FIG. 2A is a top view of a male connector unit or 40. Male connector unit 40 is formed from a complementary shape to the combination of outer housing 20 and inner housing 30 forming a slidable adjustable connecting device 10. In this case, the male connector unit 40 includes an outer rim 41, and an intermediate rim 42. Connecting outer rim 41, and intermediate rim 42 is a lip 43. Lip 43 is substantially flat. Intermediate rim 42 extends up approximately perpendicularly from first ridge 43 and extends up to second ridge 45. Inner rim 44 extends down from second ridge 45 to face 49. Coupled to face 49 is male connector 46. Male connector 46 comprises a shaft 47 and a bulb 48. Bulb 48 is coupled to shaft 47 such that there are at least a few substantially triangle shaped gaps 48.1 which allow the bulb to collapse when it is inserted into a female section.

In addition, there is also another gap region 45.1 which is bounded by intermediate rim 42, inner rim 44, and second ridge 45. The male connector device is bounded at the back end by back end 41.1 (FIG. 2B) and second ridge 45. A gap or open region 49.1 is open to receive the insertion of ridge 35.

FIG. 2C shows a top view of another male connector. In this view, there is shown a design similar to that shown in FIG. 2A. However, in this view, there is no outer rim 41.

In this view, there is shown a collapsed connector which is used to connect two different devices together.

In use, when male connector 46 is inserted into central opening 37, second ridge 45 inserts into the region between inner rim 22 of outer housing 20, and intermediate rim 34 of inner housing.

In this manner, the male connector 46 and the female connector unit 10 mesh together, and the inner housing 30 of female connector 10 can be shifted laterally so that the two connectors connect together.

Figure 3A:
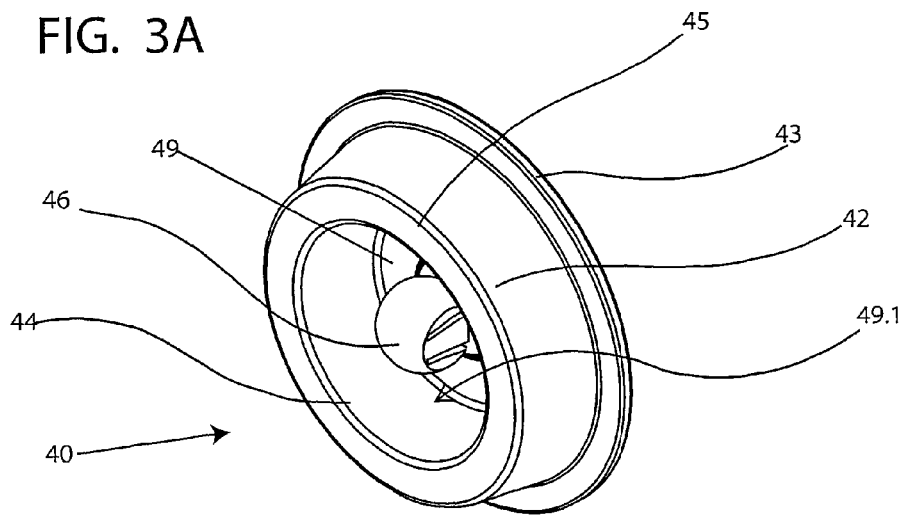
FIG. 3A is a perspective view of the male connector.

FIG. 3A is a perspective view of the male connector, wherein in this view, there is shown a first ridge 43, coupled to intermediate rim 42. Intermediate rim 42 extends up to second ridge 45. This second ridge 45 extends down to inner rim 44 forming a central gap region 49.1 bound by face 49, and inner rim 44. In addition, disposed inside of gap region 49.1 is male connector 46.

Figure 3B:
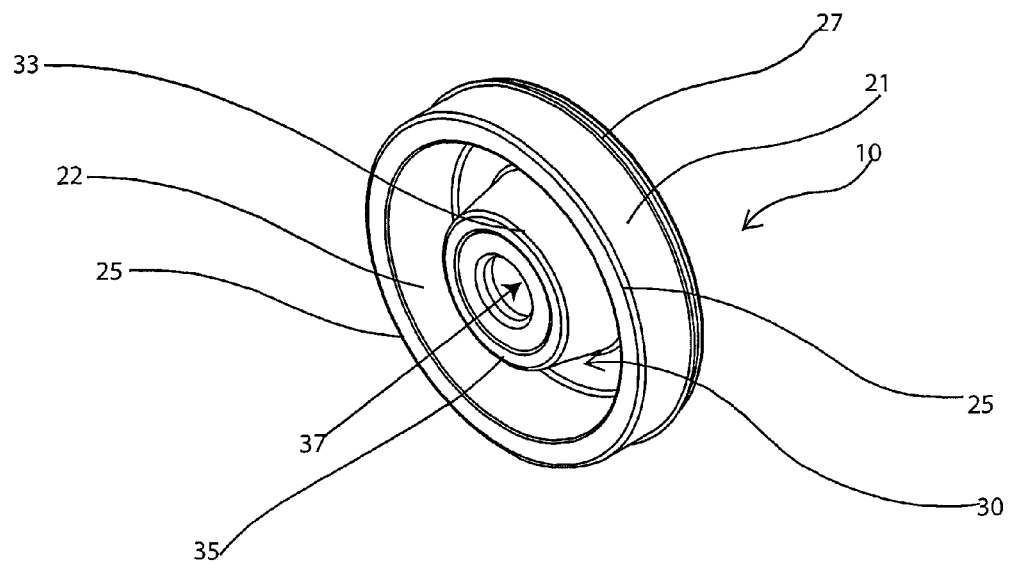
FIG. 3B is a perspective view of the female connector.

FIG. 3B is a perspective view of the female connector, wherein in this view there is shown lip 27, outer rim 21 which extends out from rim 27 to ridge 25. Inner rim 22 extends back into lip 32, forming a gap region 32.1. This gap region 32.1 is configured to receive second ridge 45, and the intermediate and inner rims of the male connector 40.

Figure 4A:
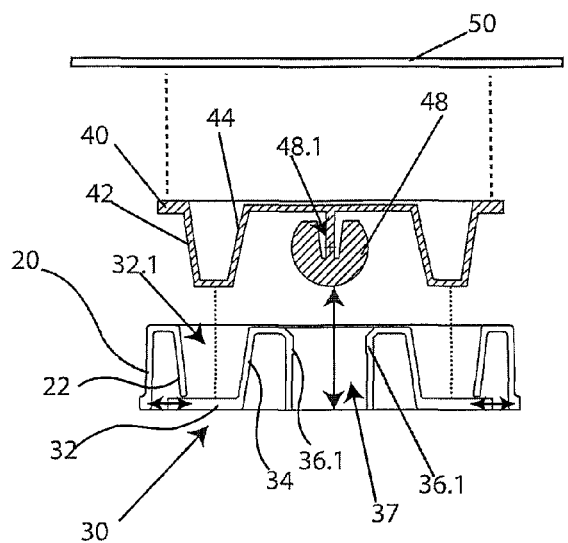
FIG. 4A is a side cross-sectional view of the male connector positioned adjacent to the female connector before insertion.

FIG. 4A is a side cross-sectional view of the male connector 40 positioned adjacent to the female connector before insertion. In this case, the male connector is positioned so that it can insert into the female connector. Because the bulb 48 of the male connector unit 40 is rounded, or spherical in shape, it can be inserted offset from the corresponding female connector hole 37, and due to its rounded exterior be slid into the corresponding female connector hole, while being offset, and then cause the slider or shifter 30 to shift laterally into position to receive the male connector. In addition, inner rim 22 of outer housing 20 and intermediate rim 34 of inner housing 30, are also angled so as to easily receive an insertion from intermediate rim 42, and inner rim 44 of male connector unit 40.

Figure 4B:
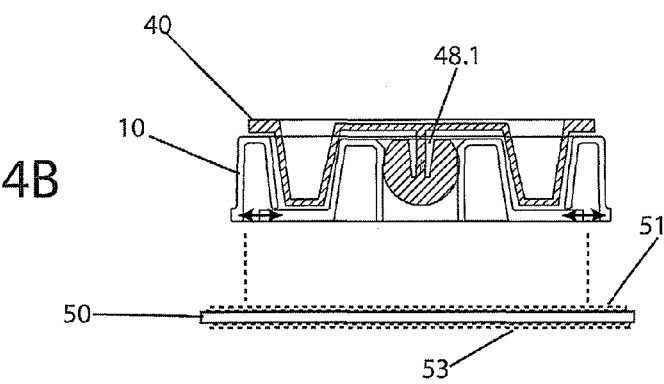
FIG. 4B is a side cross-sectional view of the male connector inserted into the female connector.

FIG. 4B is a side cross-sectional view of the male connector inserted into the female connector. In this case, the sphere or bulb 48 of male connector unit 40 is inserted into female connector central opening 37, with bulb 48 partially collapsing into gaps 48.1 and being secured against easy removal via ridge 36.1 (See FIG. 1D) which locks around bulb 48, particularly around a narrower region of bulb 48 towards a base region of shaft 47, to lock bulb 48 into place, and thereby lock male connector unit 40 into place.

Either or both male connector and connector 10 can have a backing such as backing 50. Backing 50 has an inside surface 51 which in this case is connectable to outer housing 20 at rim 27. In addition, backing 50 has an outer surface 52 opposite inner surface 51 which has an optional adhesive 53 which can be used to connect to another surface such as a boat deck, a mat, or a wall.

As stated above, if the male connector is initially inserted in an offset manner into female connector, female connector can shift laterally due to the bulb or spherical shape of bulb 48, and the angled shapes of the rims on the male and female connectors.

These types of connectors can be used for any type of connection purpose. However, below is one explanation of how a connection can be made between two mats which are connected using this type of connector.

Figure 5A:
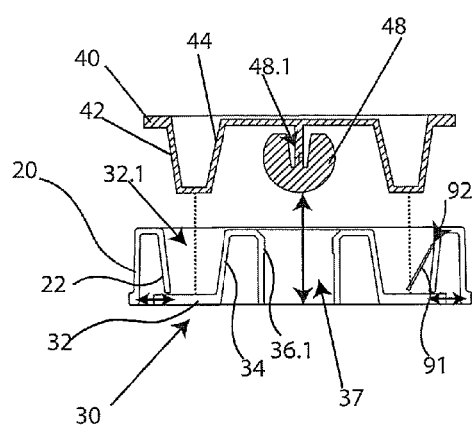
FIG. 5A is a side cross-sectional view of another embodiment having fingers.
Figure 5B:
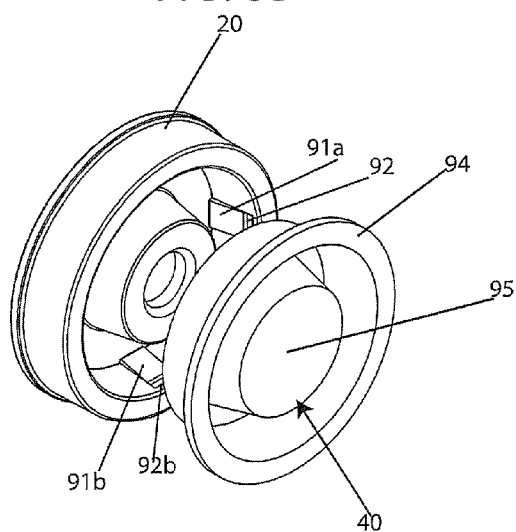
FIG. 5B is a perspective view of the assembly shown in FIG. 5A.
Figure 5C:
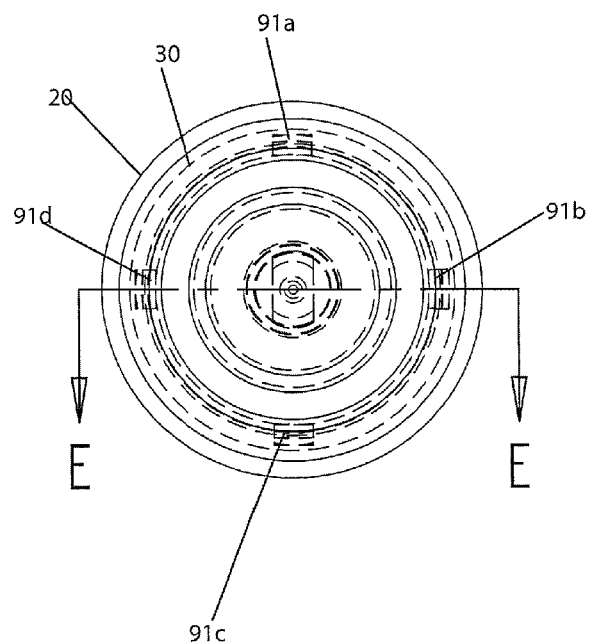
FIG. 5C is a top shaded view of the embodiment shown in FIG. 5A.

FIG. 5A is a side cross-sectional view of another embodiment having fingers 91. These fingers are coupled to an inner side wall of the outer housing 22 via a leaf spring 92. The fingers 91 can be added to an existing side wall or punched or molded into an existing inner side wall 22 thereby forming a natural or leaf spring integral with this side wall 22 of outer housing 20. This finger 91 is therefore freely movable within side wall 22. These fingers provide biasing support to push the male fastener towards a center region relative to outer housing 20. Therefore, these fingers provide support for biasing the male connector 40 towards a center position. A plurality of fingers or biasing elements 91 can be provided as shown in FIGS. 5B and 5C. These different fingers 91*a*, 91*b*, 91*c*, and 91*d* are positioned around inner side wall 22. The positioning of these different fingers can be in any known manner, however in this case, the positioning of the fingers is substantially equidistant around inner side wall 22 to allow for automatic centering in all four directions.

In addition, FIG. 5B shows two different flat backing sections 94 and 95 which show additional mounting surfaces for male fastener 40.

Figure 5D:
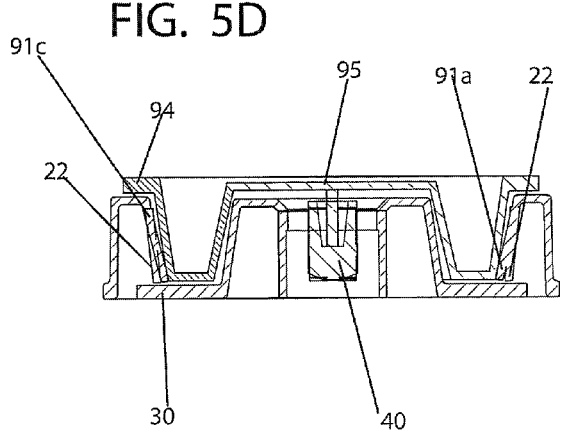
FIG. 5D is a side cross sectional view of the embodiment taken along the line E-E in FIG. 5C.

FIG. 5D is a side cross sectional view of the embodiment taken along the line E-E in FIG. 5E which shows the male fastener 40 snapped into the female fastener formed by outer housing 20 and inner housing 30. As shown, these fingers 91, are shown substantially collapsed by the insertion of the male connector 40. These fingers 91 (91*a*, 91*b*) are only configured to promote the centering of the connection and at least in this embodiment are not configured to prevent the removal of male connector 40 from the female or slidable connector.

Figure 6A:
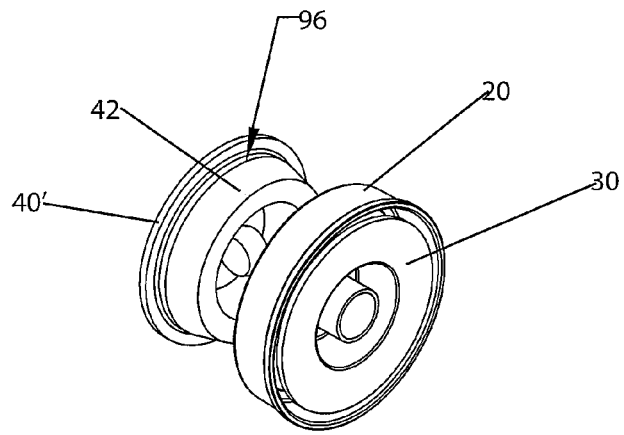
FIG. 6A is a perspective view of another embodiment of an assembly.
Figure 6B:
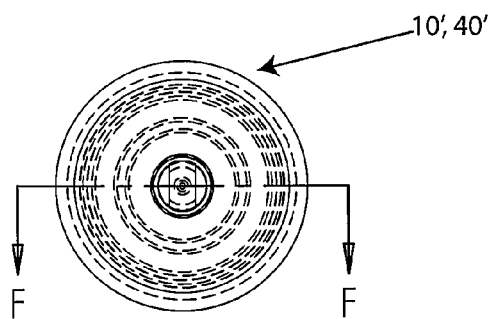
FIG. 6B is a top plan view of the embodiment shown in FIG. 6A with the outline being in dashed lines and having the bisecting line F-F.
Figure 6C:
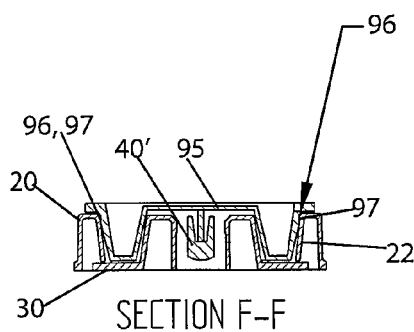
FIG. 6C is the cross sectional view of the embodiment shown in FIG. 6A taken along the line F-F.

FIG. 6A is a perspective view of another embodiment of an assembly. In this view, there is shown a male connector 40' having a flattened rim 96 which is configured to assist in connections that involve a substantially vertical orientation of the backing of the slidable connector. FIG. 6B is a top plan view of the embodiment shown in FIG. 6A with the outline being in dashed lines and having the bisecting line F-F. Thus, FIG. 6C is the cross sectional view of the embodiment shown in FIG. 6B taken along the line F-F.

Flattened rim 96 provides a different angled surface relative to the remaining surface of intermediate rim 42 of male connector 40. This flattened rim 96 provides a substantially corresponding flat interface with a flattened section 97 of inner rim 22 of outer housing 20. This flat connection surface would extend substantially perpendicular to a vertical orientation, therefore providing additional weight bearing support. This is because if the surface was angled at an angle other than substantially horizontal when the back surface of male connector was at a substantially vertical orientation, then the connection may undergo additional strain.

Figure 7A:
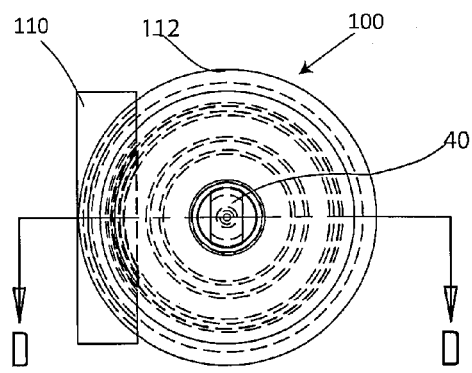
FIG. 7A is a plan view of another embodiment of the connector with the dashed lines showing internal configurations.
Figure 7C:
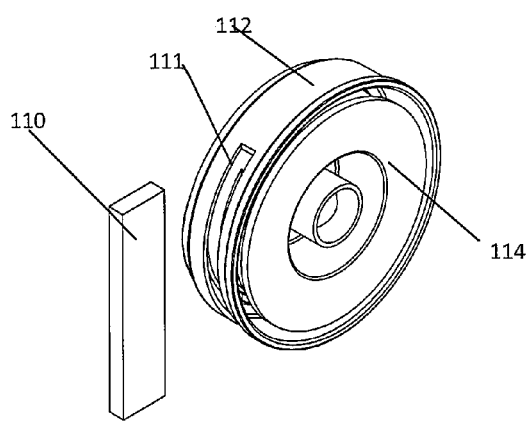
FIG. 7C is a back perspective view of the embodiment shown in FIG. 7A which shows a locking insert separate from the connector.
Figure 7B:
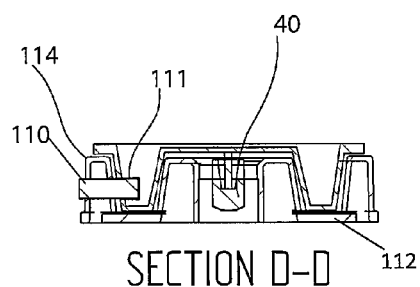
FIG. 7B is a cross-sectional view of the embodiment shown in FIG. 7A with a locking insert shown therein.
Figure 7D:
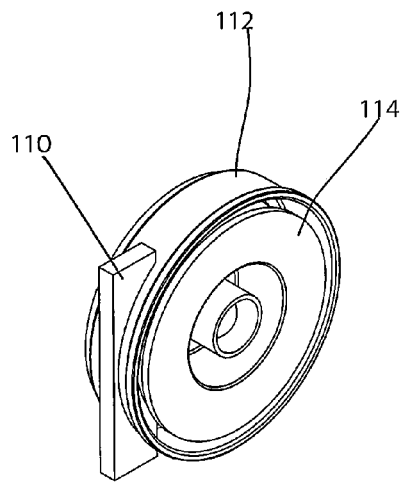
FIG. 7D shows a back perspective view of the locking insert inserted into the connector.

FIG. 7A shows a plan view of another embodiment which includes a lock or locking embodiment 100 which includes a substantially flat, planar lock or locking block 110 in the form of a rectangular cross section, type board which inserts into a corresponding slot 111 formed in outer housing 112, and inner housing 114.

Outer housing 112 is similar to housing 20 while inner housing 114 is similar to housing 30, however each of these housings contain openings or slots for receiving this locking block 110. In this case, male connector 40 also contains a corresponding opening or slot 111 which extends through outer housing 112, inner housing 114, and male connector 40 for receiving a locking block 110 and for locking all of these components together. This locking block 110 provides axial locking, by locking the removal of any one of the outer housing 112, the inner housing 114 or the male connector from at least one of the other remaining component.

Figure 8A:
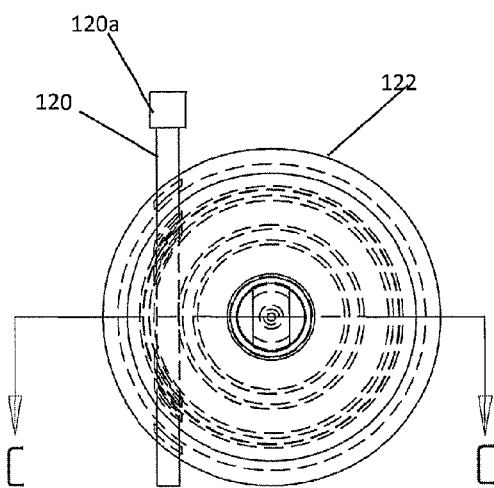
FIG. 8A shows a plan view of another embodiment showing a locking insert.
Figure 8C:
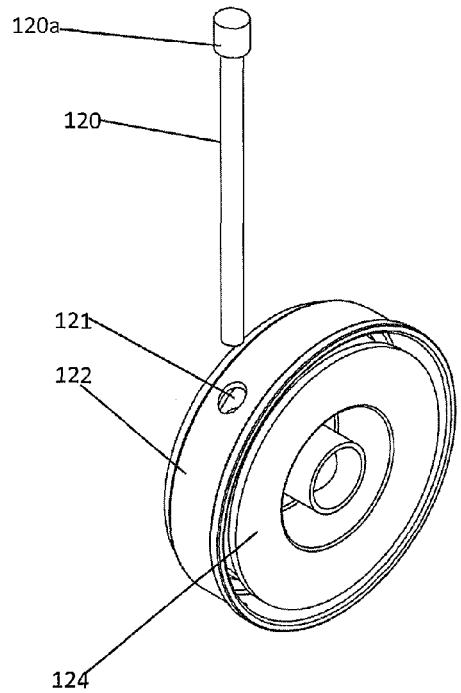
FIG. 8C is a back perspective view of the embodiment shown in FIG. 8A showing a locking pin being insertable therein, before insertion.
Figure 8B:
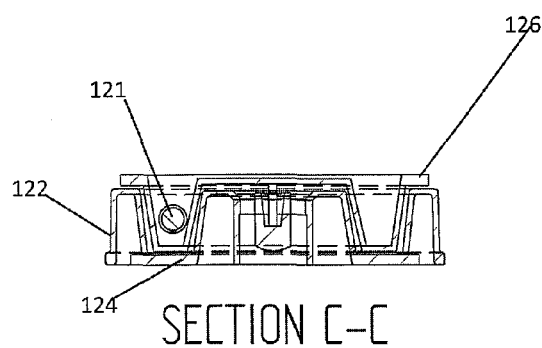
FIG. 8B shows a cross-sectional view of the embodiment shown in FIG. 8A showing a locking pin which is capable of being inserted therein.
Figure 8D:
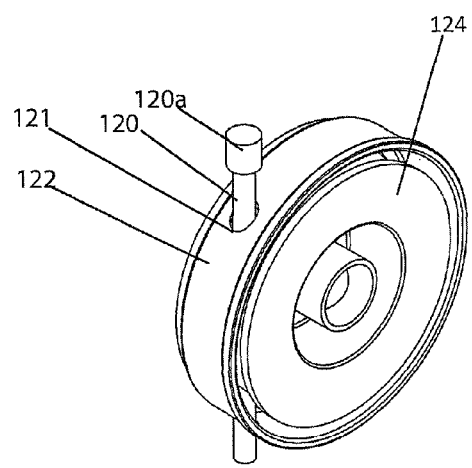
FIG. 8D is a back perspective view of the embodiment shown in FIG. 8A with the locking pin being inserted.

FIG. 8A shows a top plan view of a lockable embodiment which shows a different type of lock 120, an outer housing 122, an inner housing 124, and a corresponding hole or gap 121 (See FIGS. 8B, 8C) which extends through outer housing 122, inner housing 124, and a corresponding male connector 126 shown in FIG. 8B. Lock 120 is essentially a shaft with a wider end 120*a* wherein this shaft can be of any shape but in this case is substantially cylindrically shaped. Wider end 120*a* is wider to stop its progression through hole 121. As shown in FIG. 8B this is a cross sectional view of the view taken along the line C-C in FIG. 8A. FIG. 8C shows the lock 120 prior to insertion, with FIG. 8D showing the lock being inserted into hole 121. Once lock 120 is inserted, it slides through corresponding holes in to form a channel 121 so that all three components, the outer housing 122, the inner housing 124, and the male connector 126 are locked together. This lock also provide axial locking as described above.

Figure 9A:
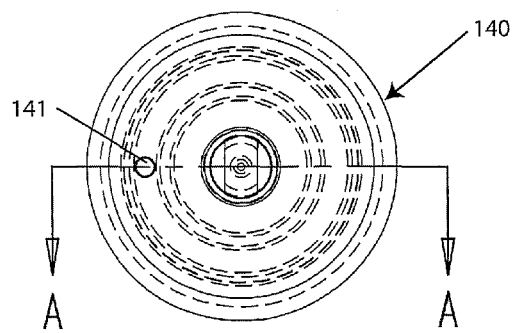
FIG. 9A is a top plan view of another embodiment having a locking pin shown.
Figure 9C:
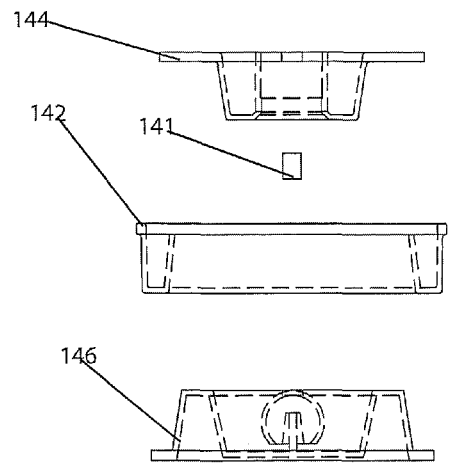
FIG. 9C is a side view of the embodiment shown in FIG. 9A in an exploded view.
Figure 9B:
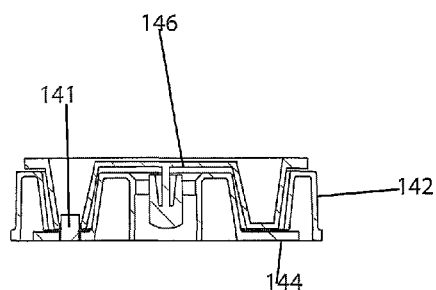
FIG. 9B is a side cross-sectional view taken along the line A-A.
Figure 9D:
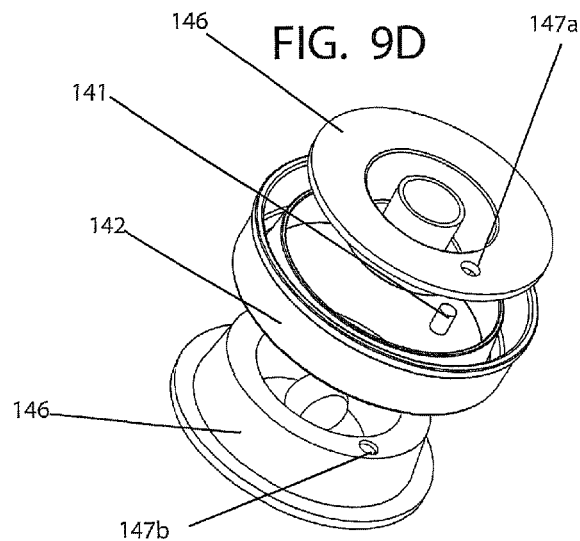
FIG. 9D is a perspective view of the embodiment shown in FIG. 9A.

FIG. 9A shows a plan view of another embodiment 140 which shows another locking element 141, with this locking element providing locking in a radial manner, thereby keeping inner ring 144 from rotating relative to outer ring 142. In addition, there is shown a male connector 146, along with holes 147*a*, and 147*b* (See FIG. 9D) forming a receptacle for receiving the locking element. These holes allow both the male connector 146 and the inner housing 144 from rotating relative to the outer housing 142. Once all three parts are snapped together, lock 141 which can be in the form of a shaft, extends through hole 147*a* on inner housing 144, and through opposite spaced hole 147*b* on male connector 146 to radially lock the inner housing 144, the outer housing 142 and the male connector together. In many cases at least one of the outer housing 142, the inner housing 144 and the male connector 146 will be fastened to a backing board, thereby preventing all other elements that are locked to it from moving.

FIG. 10A shows a side view of a mat 60 having at least one male connector unit 40. In this case, while there are only two connectors shown, there can be multiple male connectors such as four male connectors.

FIG. 10B is a bottom view of another mat 70 which has the sliding connector assembly device 10 positioned in the four corners of mat 10. This type of mat or mat system is disclosed in greater detail in U.S. Pat. No. 7,367,279 to Giannasca, the disclosure of which is incorporated herein by reference, and also in U.S. patent application Ser. No. 12/053,284, filed on Mar. 21, 2008 the disclosure of which is hereby incorporated herein by reference.

In this view, such as in FIG. 10C, mat 60 can be secured to a surface such as a boat deck, via any known means, wherein an additional mat such as mat 70 is inserted on top of mat 60 with the two connectors 10 and 40 meshing together in a complementary manner to provide shock absorbing support for a user on a boat. In particular shock absorbing support on a boat between a helm, or steering wheel and a seat on a boat such as that shown in FIGS. 11A and 11B.

Figure 11A:
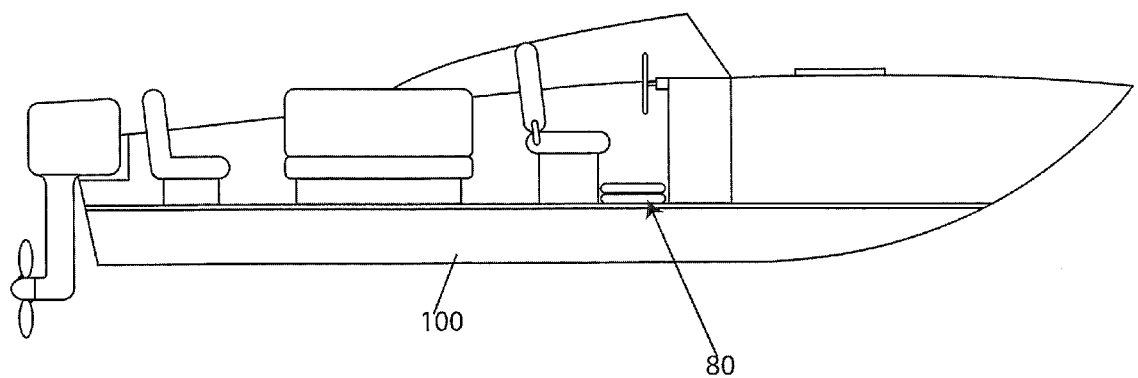
FIG. 11A shows a side cross-sectional view of the combination mat installed on a boat.
Figure 11B:
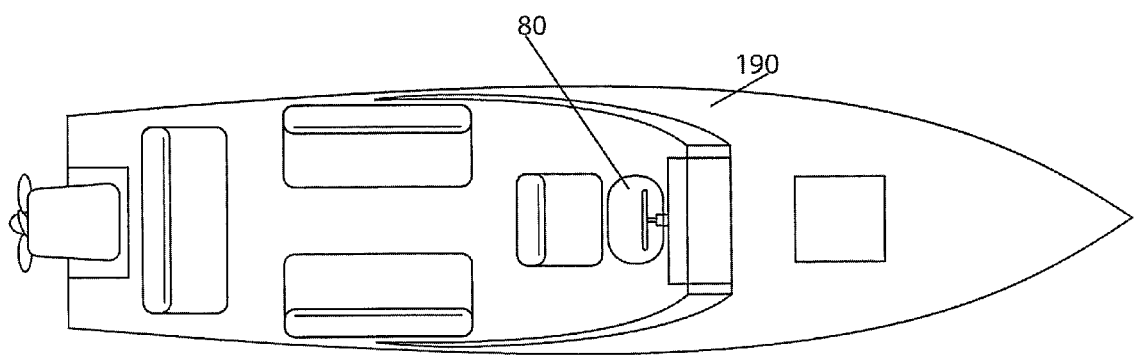
FIG. 11B shows a top view of the combination mat installed on a boat.

For example FIG. 11A shows a side cross-sectional view of a boat 190 with a combination of the two mats 60 and 70 being pressed together to form a fatigue or vibration damping mat 80. FIG. 6B shows a top view of a boat 100 which shows the placement of combination mat 80 between the steering wheel of the boat and the seat on the boat.

FIG. 12A shows a side perspective view of a peg board implementation of the connector. In this case, there is a peg board 200 which is shown being connectable to a slidable connector 10. In addition, there is shown male connector unit 40 which is connectable or connected to another surface such as a surface for a wall board, a power tool or any other type device that a user would like to have mounted on a peg board. The slidable connector 10 or the male connector 40 can be used interchangeably in that either the slidable connector 10 or the male connector 40 can be connected to the wall board 200, or to the object 210 to be coupled to the wall board. To connect the slidable connector 10 to a wall board, any known coupling element can be used such as peg locks, an adhesive or any other known element.

FIG. 12B shows a side view of the slidable connector 10 with the male connector 40 pressed therein and locked in. FIG. 12C shows a front view of the male connector 40 coupled to the peg board 200. In this figure, there is also shown a raceway 211 which is formed between object 210, and wall board 200.

With this design, because there is a slidable connector 10 which can be adjustable in position in an omnidirectional manner, the slidable connector in this case would allow for some lateral adjustability to fit objects on a peg board.

FIG. 13A shows a perspective view of the slidable connector 10 which is connectable to a male connector 40. Slidable connector is connected to a solid backing such as a divider wall 230, while male connector is connected to a solid backing such as a divider wall 220. These divider wall can be made from any material such as sheet rock, plywood or any other type of solid material. FIG. 13B shows a plan view of the male connector 40 connected to the slidable connector 10.

FIG. 13C shows a side view of a particle board backing 231 connected to a slidable connector 10. An opposite spaced plate or object 221 is connected to a male connector 40. In this embodiment as well as in the embodiments in all of FIGS. 12 and 13, the arrangement of the male 40 and female or slidable connector 10 can be reversed such that, for example, the male connector or complementary connector 40 can be connected to particle board 231, while female connector forming a slidable connector 10 is connected to plate or object 221.

FIG. 13D shows a plywood or multilayered backing 222 which is connected to one of male connector 40 or slidable connector 10 with an oppositely spaced particle board backing 232. FIG. 13E shows two different backings 222, and 233 spaced apart via a spacing region 250 with the two different backings 222 and 233 being coupled to one of the slidable connector 10 or the male connector 40. In this view there is shown a gap or raceway 239, formed between backing 222 and 233, wherein this raceway 239 can be used to string or place wires or other types of objects.

Alternatively, the slidable connector can be used to mount a peg board on a wall. In this case, if the male connector 40, or even the slidable connector 10 is connected to the peg board, other connectors positioned on different parts of a wall can also be adjusted so that the peg board can easily snap on to an opposite wall without any further adjustment.

The slidable connector can also be used in a beneficial manner in that if one wall has a different coefficient of thermal expansion than another wall, the slidable fastener 10 allows for some adjustment or movement within the fastener. This allows for two walls to be coupled together while still allowing for some form of expansion.

This slidable or adjustable connector/fastener is formed as a blind fastener or connector such that an observer would not know from an outerviewpoint, such as looking at an outer surface of backing 232 or 233 the observer would not be able to see that a fastener is being used. This is because the fastener can be mounted using an adhesive backing, or via screws or other fasteners which would not extend entirely through a complete backing board such as board 222, or 232.

Accordingly, while a few embodiments of the present invention have been shown and described, it is to be understood that many changes and modifications may be made thereunto without departing from the spirit and scope of the invention as defined in the appended claims.

What is claimed is:

1. A connector comprising:
   a) a first connector comprising:
      i) an outer housing;
      ii) an inner housing, positioned inside of said outer housing, said inner housing forming a first connection region; wherein said inner housing is movable inside of said outer housing;
   b) a complementary connector configured to connect to said first connector wherein said complementary connector is detachable from said first connector;
   wherein said outer housing has a ridge, an outer rim and an inner rim, with said inner housing being positioned substantially within said inner rim, and wherein said inner housing is slidable along a slide path from a first position to a second position within said outer housing, wherein said inner housing has a ridge spaced apart from said ridge on said outer housing and wherein said complementary connector has a first section fitting within said inner housing and a second section fitting between said inner housing and said outer housing.

2. The connector as in claim 1 wherein said outer housing has a substantially circular cross section.

3. The connector as in claim 2, wherein said outer housing has at least one outer rim, and at least one inner rim, said outer rim and said inner rim being spaced apart and defining an open region.

4. The connector as in claim 3, wherein said inner housing comprises at least one outer rim, wherein when said inner housing is disposed within said outer housing said outer rim of said inner housing is slidably disposed between said inner rim and said outer rim of said outer housing and wherein said complementary connector second section has an inner rim, an outer rim and a ridge, and wherein said first section comprises a prong, wherein said prong is disposed within said inner rim of said complementary connector.

5. The connector as in claim 1, wherein said inner housing has a substantially circular cross section.

6. The connector as in claim 1, wherein said second section of said complementary connector is configured to fit between said ridge of said outer housing and said ridge of said inner housing of said first connector.

7. The connector as in claim 6, wherein said inner housing has at least one inner rim, and at least one outer open region formed between said outer rim and said inner rim, and at least one inner open region formed inside of said inner rim.

8. The connector as in claim 7, wherein said inner housing has at least one intermediate rim spaced between said outer rim and said inner rim.

9. The connector as in claim 7, wherein said inner housing forms a female connector and said complementary connector is configured as a male connector.

10. The connector as in claim 9, wherein said male connector comprises a prong.

11. The connector as in claim 10, wherein said inner housing is made from a substantially flexible material, and wherein said inner rim of said inner housing is configured to receive said prong of said male connector.

12. The connector as in claim 11, wherein said prong comprises a shaft and a bulb portion.

13. The connector as in claim 12, wherein said inner rim of said inner housing further comprises a ridge, wherein said ridge of said inner rim, is configured to allow said prong of said male connector to snap into said inner opening of said inner housing.

14. The connector as in claim 6, wherein said outer rim of said outer housing has a greater depth from said ridge than said inner rim of said outer housing.

15. The connector as in claim 14, wherein said outer rim of said inner housing has a greater diameter than said inner rim of said outer housing, wherein when said inner housing is placed within said outer housing, said outer rim of said inner housing is trapped and bound by said outer rim of said outer housing and said inner rim of said outer housing.

16. The connector as in claim 15, wherein said inner rim of said outer housing and said outer rim of said inner housing intersect each other in a substantially perpendicular manner.

17. The connector as in claim 1, further comprising a backing coupled to said outer housing, wherein said backing is configured to keep said inner housing disposed within said outer housing.

18. The connector as in claim 17, wherein said backing has an inside surface and an outside surface wherein said backing has an adhesive disposed on said outside surface.

19. A connector comprising:
 a) a first connector comprising:
  i) an outer housing;
  ii) an inner housing, positioned inside of said outer housing, said inner housing forming a first connection region; wherein said inner housing is movable inside of said outer housing;
 b) a complementary connector configured to connect to said first connector;
 c) at least one lock for locking said outer housing to at least one of said inner housing, and said complementary connector.

20. The connector as in claim 19, wherein said lock is configured to lock said outer housing to said inner housing in a radial manner.

21. The connector as in claim 19, wherein said lock is configured to lock said outer housing to said complementary connector in an axial manner.

22. A method for connecting two objects together comprising:
 a) providing at least one outer housing;
 b) providing at least one inner housing in the form of a female connector;
 c) positioning said female connector inside of said outer housing, said female connector being slidably disposed within said outer housing, such that said female connector is movable in at least three different axial directions wherein said female connector is slidable along a slide path from a first position to a second position within said outer housing;
 d) coupling at least one male connector to said female connector to connect at least two objects together wherein said at least one male connector has a first section that fits within said at least one inner housing and a second section that fits between said inner housing and said at least one outer housing.

\* \* \* \* \*